(12) United States Patent
Ishikawa et al.

(10) Patent No.: US 10,875,938 B2
(45) Date of Patent: Dec. 29, 2020

(54) PEROXIDE REACTION METHOD AND PEROXIDE REACTION DEVICE USING EXTRUDER

(71) Applicant: THE JAPAN STEEL WORKS, LTD., Tokyo (JP)

(72) Inventors: Makoto Ishikawa, Hiroshima (JP); Seiji Takamoto, Hiroshima (JP); Kyohei Yata, Hiroshima (JP); Mitsuhiro Seo, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 15/740,913

(22) PCT Filed: Jul. 1, 2015

(86) PCT No.: PCT/JP2015/068971
§ 371 (c)(1),
(2) Date: Dec. 29, 2017

(87) PCT Pub. No.: WO2017/002227
PCT Pub. Date: Jan. 5, 2017

(65) Prior Publication Data
US 2018/0194878 A1     Jul. 12, 2018

(51) Int. Cl.
*C08J 3/24*     (2006.01)
*C08F 8/00*     (2006.01)
(Continued)

(52) U.S. Cl.
CPC ............ *C08F 8/50* (2013.01); *B29B 7/244* (2013.01); *B29B 7/286* (2013.01); *B29C 48/29* (2019.02);
(Continued)

(58) Field of Classification Search
None
See application file for complete search history.

(56) References Cited

U.S. PATENT DOCUMENTS 5,393,630 A * 2/1995 Bayley ............... G03G 9/081
430/105
2001/0053816 A1 * 12/2001 Kinoshita ............ C08F 291/00
525/75
(Continued)

FOREIGN PATENT DOCUMENTS

DE    24 04 658     8/1975
JP    6-170914      6/1994
(Continued)

OTHER PUBLICATIONS

Extended European Search Report dated Feb. 12, 2019 in corresponding European patent application No. 15897154.9.

*Primary Examiner* — Tae H Yoon
(74) *Attorney, Agent, or Firm* — Wenderoth, Lind & Ponack, L.L.P.

(57) ABSTRACT

This invention is to improve the reaction efficiency of a peroxide introduced into a cylinder compared with conventional art. In the peroxide reaction method and peroxide reaction device using an extruder according to this invention, in which a peroxide and a raw material such as a synthetic resin, a natural resin, and an elastomer are introduced into a cylinder of the extruder, wherein the raw material and the peroxide are reacted with each other in the cylinder, the raw material is introduced from a raw material supply hopper, the peroxide is introduced from a downstream side of the raw material supply hopper, and the temperature of the raw material in a peroxide introduction portion is adjusted to a temperature lower than the one-minute half-life temperature of the peroxide.

5 Claims, 3 Drawing Sheets

(51) Int. Cl.
  *C08F 8/50* (2006.01)
  *B29C 48/92* (2019.01)
  *B29C 48/29* (2019.01)
  *B29C 48/80* (2019.01)
  *B29C 48/285* (2019.01)
  *B29B 7/24* (2006.01)
  *B29B 7/28* (2006.01)

(52) U.S. Cl.
  CPC ............ *B29C 48/297* (2019.02); *B29C 48/83* (2019.02); *B29C 48/92* (2019.02); *C08J 3/24* (2013.01); *B29C 2948/92704* (2019.02); *B29C 2948/92876* (2019.02); *C08F 2500/12* (2013.01); *C08F 2810/20* (2013.01); *C08J 2323/26* (2013.01)

(56) References Cited

U.S. PATENT DOCUMENTS

| | | | | |
|---|---|---|---|---|
| 2002/0136914 A1* | 9/2002 | Uchida | .................... | B32B 27/32 |
| | | | | 428/515 |
| 2008/0090478 A1* | 4/2008 | Amou | ...................... | B32B 5/02 |
| | | | | 442/136 |
| 2015/0166853 A1* | 6/2015 | Chen | .................. | C09J 123/0815 |
| | | | | 428/355 EN |
| 2017/0217130 A1* | 8/2017 | Chopin, III | ............... | B32B 7/12 |

FOREIGN PATENT DOCUMENTS

| | | |
|---|---|---|
| JP | 10-195219 | 7/1998 |
| JP | 2004-359910 | 12/2004 |
| JP | 2006-150936 | 6/2006 |

\* cited by examiner

PEROXIDE REACTION METHOD AND PEROXIDE REACTION DEVICE USING EXTRUDER

CROSS-REFERENCE TO RELATED APPLICATION

This application is a 371 National Stage Application, which claims the benefit of International Application No. PCT/JP2015/068971, filed on Jul. 1, 2015, the content of which is hereby incorporated by reference in its entirety.

TECHNICAL FIELD

This invention relates to a peroxide reaction method and a peroxide reaction device using an extruder, and more particularly to a novel improvement for enhancing reaction efficiency between a peroxide and a raw material.

BACKGROUND ART

In a typical, conventional method, a peroxide and a raw material are reacted with each other using an extruder. For example, viscosity or another property is adjusted by reacting polypropylene, polyethylene, or an elastomer with a peroxide.

In a conventional method, the peroxide and the raw material are mixed together in advance at a low enough temperature to ensure that the peroxide substantially does not react, whereupon the mixture is introduced all at once into a raw material supply hopper of an extruder and a peroxide reaction is implemented by the extruder. However, recent years have witnessed an increase in the number of cases where, a method of introducing the peroxide directly into the extruder without mixing the peroxide and the raw material together in advance is employed aimed at rationalization in order to reduce the construction costs of a resin processing plant.

And the reaction speed of peroxidation is temperature-dependent, and therefore the reaction speed increases as the temperature rises. Hence, to achieve a continuous reaction in a limited reaction time such as that of an extruder, the reaction temperature must be raised so that the reaction of the introduced peroxide is completed within a residence time in the extruder.

In order to ensure that the peroxide and the raw material react with each other efficiently, the peroxide must be mixed into the raw material evenly. More specifically, there is a problem that, if the reaction speed becomes too high before the added peroxide is mixed sufficiently into the raw material, the reaction proceeds before the peroxide has reacted with the raw material and the reaction efficiency between the peroxide and the raw material decreases from a target efficiency. Under current circumstances, excessive peroxide is added to compensate for the reduction in reaction efficiency between the peroxide and the raw material.

Patent Document 1 proposes a method using an extruder as a method of manufacturing a silane cross-linked polyethylene for pipes, silane-modified polyethylene compositions, or the like, wherein, in a method for pre-blending a peroxide with a raw material or the like and then supplying the pre-blended mixture to the extruder, the mixture is subjected to raw material feeding by a raw material feeding portion at a temperature that is at least 10° C. lower than a one-minute half-life temperature of an organic peroxide, and then reacted by being melted and kneaded. In this method, however, pre-blending is used.

Moreover, in a manufacturing method for a polypropylene-based resin composition, a reaction method using an extruder is proposed as a manufacturing method for modifying a propylene-ethylene block copolymer, and a method wherein the half-life of the organic peroxide at a raw material temperature at an organic peroxide addition position is within a range of 1 to 60 seconds is described. With this method, however, the reaction efficiency is not improved.

CONVENTIONAL ART DOCUMENTS

Patent Documents

[Patent Document 1] Japanese Patent Application Publication No. 2011-12208
[Patent Document 2] Japanese Patent Application Publication No. H11-35788

SUMMARY OF THE INVENTION

Problems to be Solved by the Invention

Since conventional peroxide reaction methods using an extruder are configured as described above, the following problems remain.

In the method of Patent Document 1, the raw material and the peroxide are introduced into the extruder after being mixed together in advance, and therefore an additional mixing facility is required, leading to an increase in the size of the extruder facility itself and an increase in cost.

Further, in the description of Patent Document 2, the half-life of the organic peroxide at the raw material temperature at the organic peroxide addition position is within a range of 1 to 60 seconds. However, this method does not improve the reaction efficiency.

This invention has been designed to solve the problems described above, and specifically, an object thereof is to provide a peroxide reaction method and a peroxide reaction device using an extruder, with which a reaction efficiency between a peroxide and a raw material is improved.

Means for Solving the Problems

A peroxide reaction method using an extruder according to this invention, in which a peroxide and a raw material constituted by any one of a synthetic resin, a natural resin, and an elastomer are introduced individually into a cylinder of an extruder without being mixed together in advance, the cylinder having a temperature adjustment function, wherein the raw material and the peroxide are reacted with each other in the cylinder, includes: introducing the raw material from a raw material supply hopper; introducing the peroxide from a peroxide introduction portion provided on a downstream side of the raw material supply hopper; and adjusting a temperature of the raw material in the peroxide introduction portion to a temperature lower than a one-minute half-life temperature of the peroxide by using at least the temperature adjustment function. Further, according to this method, at least a solid transportation portion, a plasticization and kneading portion, and a melt transportation portion are formed in the cylinder from an upstream side, and the peroxide introduction portion is positioned on an upstream side of an upstream position of the melt transportation portion. Further, according to this method, the extruder is a twin screw extruder. Further, according to this method, the raw material is polypropylene or polyethylene. Further, according to this method, the one-minute half-life temperature of the peroxide is from 50° C. to 300° C. Further, according to this method, the one-minute half-life temperature of the peroxide is from 100° C. to 200° C. Further, according to this method, if a melting point of the resin serving as the raw material is higher than the one-minute half-life temperature of the peroxide, the peroxide introduction portion is positioned on an upstream side of the plasticization and kneading portion. Furthermore, in a peroxide reaction device using an extruder according to this invention, in which a peroxide and a raw material constituted by one of a synthetic resin, a natural resin, and an elastomer are introduced individually into a cylinder of an extruder, the cylinder having a temperature adjustment function, without being mixed together in advance, wherein the raw material and the peroxide are reacted with each other in the cylinder, wherein: the raw material is introduced from a raw material supply hopper; the peroxide is introduced from a peroxide introduction portion provided on a downstream side of the raw material supply hopper; and a temperature of the raw material in the peroxide introduction portion is adjusted to a temperature lower than a one-minute half-life temperature of the peroxide using at least the temperature adjustment function. Further, according to this device, at least a solid transportation portion, a plasticization and kneading portion, and a melt transportation portion are formed in the cylinder from an upstream side, and the peroxide introduction portion is positioned on an upstream side of an upstream position of the melt transportation portion. Further, according to this device, the extruder is a twin screw extruder. Further, according to this device, the raw material is polypropylene or polyethylene. Further, according to this device, the one-minute half-life temperature of the peroxide is from 50° C. to 300° C. Further, according to this device, the one-minute half-life temperature of the peroxide is from 100° C. to 200° C. Further, according to this device, if a melting point of the resin serving as the raw material is higher than the one-minute half-life temperature of the peroxide, the peroxide introduction portion is positioned on an upstream side of the plasticization and kneading portion.

Effect of the Invention

Because the peroxide reaction method and peroxide reaction device using an extruder according to this invention are configured as described above, the following effects can be obtained.

The peroxide and the raw material are reacted with each other and processed by adding the raw material and the peroxide to inside the cylinder of the extruder from the raw material supply hopper and the peroxide introduction portion provided on the downstream side of the raw material supply hopper, respectively, without mixing together the peroxide and the raw material in advance, and adjusting the temperature of the raw material in the peroxide introduction portion to a temperature lower than the one-minute half-life temperature of the peroxide. In so doing, facilities can be simplified in comparison with a conventional art, and a large improvement in reaction efficiency can be achieved over the conventional art.

EMBODIMENTS OF THE INVENTION

A peroxide reaction method and a peroxide reaction device using an extruder according to this invention are an improvement in a reaction efficiency between the peroxide and the raw material by introducing a peroxide and a raw material are introduced into a cylinder independently of each other rather than being mixed together in advance on the exterior of the cylinder.

Embodiments

A preferred embodiment of a peroxide reaction method and a peroxide reaction device using an extruder according to this invention will be described below together with the drawings.

Figure 1:
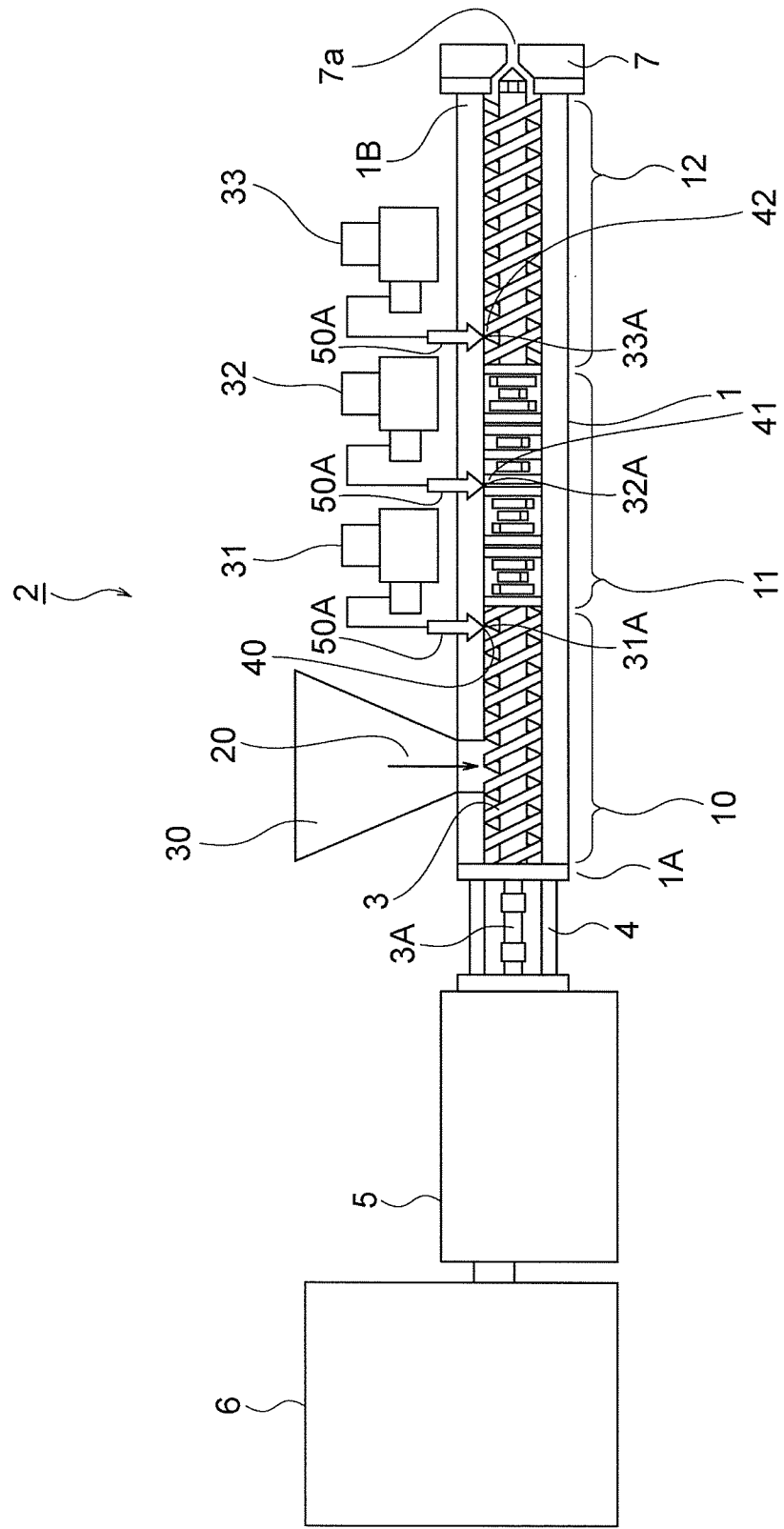
FIG. 1 is a sectional view showing a configuration of an extruder with which to implement a peroxide reaction method and a peroxide reaction device using an extruder according to this invention.

FIG. 1 shows a preferred embodiment of the peroxide reaction method and peroxide reaction device using an extruder according to this invention, wherein a liquid peroxide is introduced into a cylinder.

In FIG. 1, a reference numeral 1 denotes a cylinder of a single screw or twin screw extruder 2 in which a raw material and the peroxide are reacted with each other, a single-shaft or twin-shaft screw 3 being disposed in the cylinder 1 to be freely rotatable. Note that a die 7 having an extrusion hole 7a is provided on a tip end serving as a downstream side 1B of the cylinder 1.

A reduction gear 5 and a rotary driving body (constituted by a motor or the like) 6 are connected to the cylinder 1 via a connecting member 4.

A screw shaft 3A of the screw 3 is connected to an output side of the reduction gear 5 and configured such that the screw 3 can be rotated via the reduction gear 5 by rotating the rotary driving body 6.

The cylinder 1 is divided into three regions, namely a solid transportation portion 10, a plasticization and kneading portion 11, and a melt transportation portion 12, from an upstream side 1A toward the downstream side 1B.

The solid transportation portion 10 is provided with a raw material supply hopper 30 for introducing a raw material 20 constituted by one of a synthetic resin, a natural resin, an elastomer, or the like into the cylinder 1.

First, second, and third liquid addition pumps 31, 32, 33 are disposed independently of each other in the cylinder 1, and a first peroxide introduction portion 31A of the first liquid addition pump 31 is positioned at a downstream position 40 of the solid transportation portion 10.

A second peroxide introduction portion 32A of the second liquid pump 32 is positioned at a substantially central position 41 of the plasticization and kneading portion 11.

A third peroxide introduction portion 33A of the third liquid pump 33 is positioned at an upstream position 42 of the melt transportation portion 12. The upstream position 42 is a position close to the plasticization and kneading portion 11. Note that the respective peroxide introduction portions 31A, 32A, 33A are each formed in a structure having a pipe including a check valve attached within a hole, not shown in the figure, formed in the cylinder 1, for example.

Next, an operation of the peroxide reaction method and peroxide reaction device using an extruder according to this invention will be described.

First, the raw material 20, which is introduced into the cylinder 1 of the extruder 2 from the raw material supply hopper 30, is conveyed to the downstream side 1B by the solid transportation portion 10 by rotating the screw 3, and then plasticized and kneaded in the plasticization and kneading portion 11.

In this condition, the first to third liquid pumps 31 are operated by a predetermined program of a control portion, not shown in the figure, whereby liquid peroxide is introduced into the cylinder 1 from one or all of the first, second, and third peroxide introduction portions 31A, 32A, 33A so that the peroxide 50A and the raw material 20 are melted and kneaded in the cylinder 1 and a reaction occurs.

This reaction can be used to adjust the viscosity and other properties of the raw material 20. Note that the liquid peroxide 50A may be used as is, or may be used after being diluted in oil or the like.

If the peroxide 50A is constituted by a liquid or a liquid mixture, as in FIG. 1, the peroxide 50A is introduced into the cylinder 1 via the first, second, and third liquid addition pumps 31, 32, 33 respectively having the peroxide introduction portions 31A, 32A, 33A. However, in another embodiment shown in FIG. 2, a solid peroxide 50 is used instead of the liquid peroxide 50A, and accordingly, first to third volumetric supply devices 51 to 53 constituted by any of a conventional screw feeder, belt feeder, table feeder, or the like are used to introduce the solid peroxide 50 into the cylinder 1, whereby the solid peroxide 50 can be introduced into the cylinder 1 via the first to third peroxide introduction portions 31A, 32A, 33A of the cylinder 1. Note that in FIG. 2, portions that are identical to FIG. 1 have been allocated identical reference numerals, and description thereof has been omitted to avoid duplication.

Figure 2:
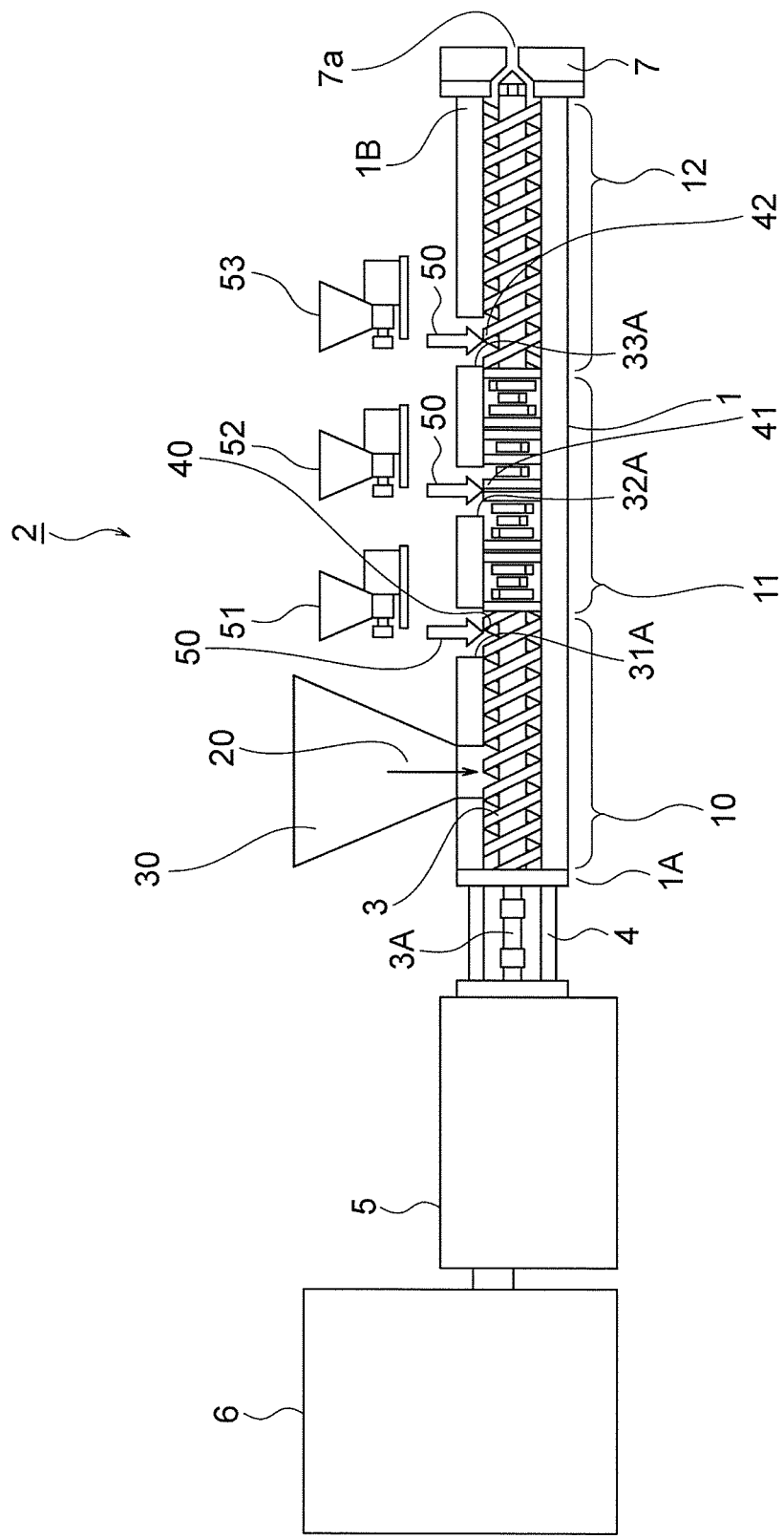
FIG. 2 is a sectional view showing the configuration of FIG. 1 in another condition.

The peroxide 50, 50A can be introduced using the upstream side, the downstream side, or any of the aforesaid locations of the plasticization and kneading portion 11, as in the configurations shown in FIGS. 1 and 2, and a plurality of locations may be used together. The cylinder 1 is constituted by a plurality of cylinder segments (not shown), and a temperature adjustment function is obtained by providing each cylinder segment with heating means such as an electric heater, a steam heater, an oil heater, or a hot water heater, and cooling means realized by supplying a cooling medium such as cooling water.

The introduction portions 31A, 32A, 33A for the peroxide 50, 50A can be adjusted to a temperature lower than a one-minute half-life temperature of the peroxide 50, 50A, which is a feature of this invention, using the aforesaid temperature adjustment function of the cylinder 1 or by adjusting the shape of the screw. Further, it is known that a reaction speed of the peroxide 50, 50A is temperature-dependent, or in other words that the reaction speed increases as the temperature rises. Furthermore, the reaction of the peroxide 50, 50A proceeds over time, and therefore, to ensure that the peroxide 50, 50A is used effectively in the reaction, it is important to adjust the reaction speed so that the reaction is completed within a period extending from the point at which the peroxide 50, 50A is introduced into the cylinder 1 of the extruder to a point at which the peroxide 50, 50A is discharged to the exterior of the cylinder 1, or in other words within a residence time. Moreover, as a criterion for completing the reaction, it is important to set the temperature at a temperature at which the peroxide decreases by half four times within the residence time for a portion wherein peroxide reacts, or to adjust the residence time to a residence time within which the peroxide decreases by half four times at a temperature of a portion wherein the peroxide reacts.

Hence, if the temperature of the respective peroxide introduction portions 31A, 32A, 33A is set excessively high, a problem occurs that the peroxide 50, 50A starts reacting before being dispersed sufficiently through the raw material 20 or the like and a reaction rate with the raw material 20 is reduced. According to this invention, therefore, the temperature of the respective peroxide introduction portions 31A, 32A, 33A is adjusted so as to be lower than the one-minute half-life temperature of the used peroxide 50, 50A, and in so doing, the aforesaid reduction in the reaction rate can be suppressed, or in other words the reaction efficiency can be improved. Hence, increasing the reaction speed by raising the temperature on the downstream side of the respective peroxide introduction portions 31A, 32A, 33A is effective as means for increasing the reaction rate, and therefore the reaction efficiency, within the limited residence time in the cylinder of the extruder.

EXAMPLE

Next, results of a reaction test performed using the peroxide reaction method and peroxide reaction device using an extruder according to this invention will be described.

In the example, the device and raw material described below were used.

Extruder: twin screw extruder, CMP69 (manufactured by The Japan Steel Works Ltd.)

Inner diameter of extruder cylinder: 69 mm

Extruder L/D (ratio of total screw length to cylinder inner diameter): 35 L/D

Raw material: polypropylene (MFR=2.0)

Raw material throughput: 320 kg/h

Peroxide: organic peroxide

Peroxide addition amount: 1000 ppm

Figure 3:
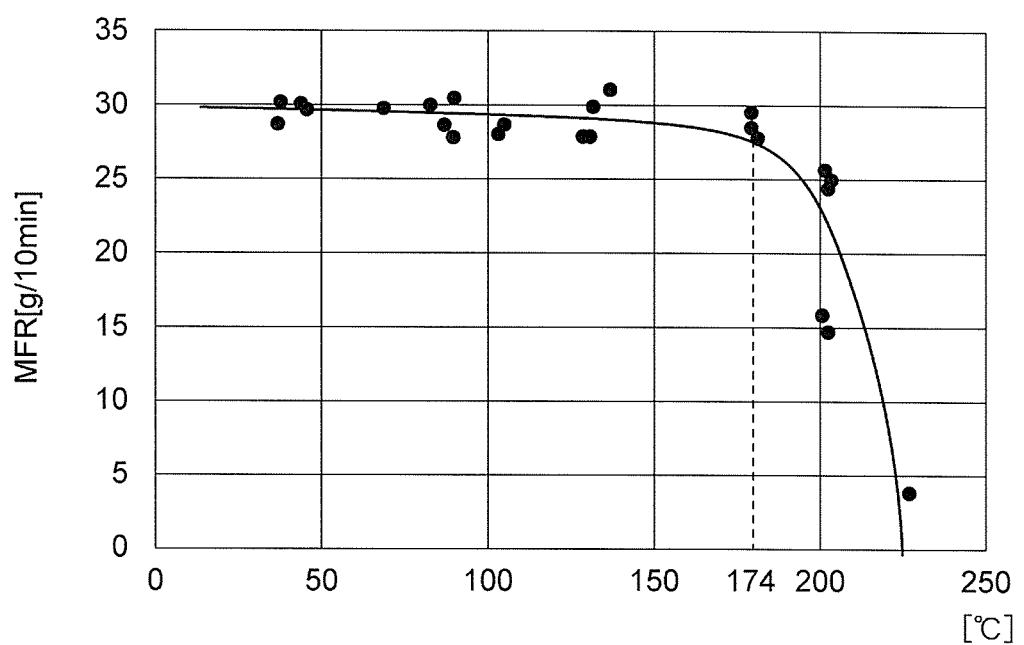
FIG. 3 is a characteristic diagram showing a relationship between a temperature of a peroxide introduction portion of the extruder and an MFR of a product.

The raw material temperature in the respective peroxide introduction portions 31A, 32A, 33A was varied using the temperature adjustment function of the cylinder and by adjusting the shape of the screw. In this example, the peroxide 50 or 50A has an effect of increasing the MFR by reacting with the raw material 20. Therefore, by measuring the MFR [g/min] of a product, the reaction rate of the peroxide 50 or 50A can be estimated. FIG. 3 shows the temperature of the peroxide introduction portions 31A, 32A, 33A and the MFR of a manufactured product. It is clear that the MFR becomes small where the temperature of the peroxide introduction portions 31A, 32A, 33A exceeds the one-minute half-life temperature=174° C.

The gist of the peroxide reaction method and peroxide reaction device using an extruder according to this invention is as follows.

In the peroxide reaction method and peroxide reaction device using an extruder, in which the peroxide 50 or 50A and the raw material 20 constituted by one of a synthetic resin, a natural resin, and an elastomer are introduced individually into the cylinder 1 of the extruder 2, the cylinder 1 having a temperature adjustment function, without being mixed together in advance, wherein the raw material 20 and the peroxide 50 or 50A are reacted with each other in the cylinder 1, characterized in that: the raw material 20 is introduced from the raw material supply hopper 30; the peroxide 50 or 50A is introduced from the peroxide introduction portions 31A, 32A, 33A provided on the downstream side of the raw material supply hopper 30; and the temperature of the raw material 20 in the peroxide introduction portions 31A, 32A, 33A is adjusted to a temperature lower than the one-minute half-life temperature of the peroxide 50 or 50A using at least the temperature adjustment function. Further, the method and device are characterized in that, at least the solid transportation portion 10, the plasticization and kneading portion 11, and the melt transportation portion 12 are formed in the cylinder 1 from the upstream side, and the peroxide introduction portions 31A, 32A, 33A are positioned on an upstream side of an upstream position 42 of the melt transportation portion 12. Further, the method and device are characterized in that the extruder 2 is a twin screw extruder. Further, the method and device are characterized in that the raw material 20 is polypropylene or polyethylene. Further, the method and device are characterized in that the one-minute half-life temperature of the peroxide 50 or 50A is from 50° C. to 300° C. Further, the method and device are characterized in that the one-minute half-life temperature of the peroxide 50 or 50A is from 100° C. to 200° C. Further, the method and device are characterized in that, if a melting point of the resin serving as the raw material 20 is higher than the one-minute half-life temperature of the peroxide 50 or 50A, the peroxide introduction portion 31A is positioned on an upstream side of the plasticization and kneading portion 11.

INDUSTRIAL APPLICABILITY

In the peroxide reaction method and peroxide reaction device using an extruder according to this invention, a peroxide is introduced into a cylinder from a downstream side of a raw material supply hopper, whereupon a raw material temperature in a peroxide introduction portion is adjusted to a lower temperature than a one-minute half-life temperature of the peroxide. In so doing, a reduction in a reaction rate of the peroxide can be suppressed and reaction efficiency can be improved.

REFERENCE SIGNS LIST

1 Cylinder
1A Upstream side
1B Downstream side
2 Extruder
3 Screw
3A Screw shaft
4 Connecting member
5 Reduction gear
6 Rotary driving body (motor)
10 Solid transportation portion
11 Plasticization and kneading portion
12 Melt transportation portion
20 Raw material
30 Raw material supply hopper
31, 32, 33 First, second, and third liquid addition pumps
31A, 32A, 33A First, second, and third peroxide introduction portions
40 Downstream position
41 Central position
42 Upstream position
50A Peroxide (liquid)
50 Solid peroxide

The invention claimed is:

1. A peroxide reaction method comprising:
providing an extruder comprising a cylinder,
wherein the extruder has at least a solid transportation portion, a plasticization and kneading portion, and a melt transportation portion formed in the cylinder from an upstream side to a downstream side;
introducing a raw material into the extruder from a raw material supply hopper,
wherein the raw material is at least one selected from the group consisting of a synthetic resin, a natural resin, and an elastomer;
introducing a peroxide into the extruder at at least one peroxide introduction portion provided on a downstream side of the raw material supply hopper,
wherein at least one of the at least one peroxide introduction portions is positioned on an upstream side of an upstream position of both the melt transportation portion and the plasticization and kneading portion; and
adjusting a temperature of the raw material in the peroxide introduction portion to a temperature lower than a one-minute half-life temperature of the peroxide by adjusting the temperature of the cylinder,
wherein the peroxide and the raw material are introduced individually into the cylinder of the extruder without being mixed together in advance, and
wherein the raw material and the peroxide react with each other in the cylinder.

2. The peroxide reaction method using an extruder according to claim 1, wherein the extruder is a twin screw extruder.

3. The peroxide reaction method using an extruder according to claim 1, wherein the raw material is polypropylene or polyethylene.

4. The peroxide reaction method using an extruder according to claim 1, wherein the one-minute half-life temperature of the peroxide is from 50° C. to 300° C.

5. The peroxide reaction method using an extruder according to claim 1, wherein the one-minute half-life temperature of the peroxide is from 100° C. to 200° C.

* * * * *